US008931995B2

(12) United States Patent
Fitzgerald et al.

(10) Patent No.: US 8,931,995 B2
(45) Date of Patent: Jan. 13, 2015

(54) SEED CART

(75) Inventors: Christopher T. Fitzgerald, Pomeroy, IA (US); Kurt W. Olsen, Newell, IA (US); Daniel L. Frederick, Storm Lake, IA (US)

(73) Assignee: Meridian Manufacturing Group, Storm Lake, IA (US)

( * ) Notice: Subject to any disclaimer, the term of this patent is extended or adjusted under 35 U.S.C. 154(b) by 180 days.

(21) Appl. No.: 13/367,421

(22) Filed: Feb. 7, 2012

(65) Prior Publication Data

US 2012/0201631 A1 Aug. 9, 2012

Related U.S. Application Data

(60) Provisional application No. 61/439,960, filed on Feb. 7, 2011.

(51) Int. Cl.
| | |
|---|---|
| *G01G 19/08* | (2006.01) |
| *B65G 67/02* | (2006.01) |
| *B65G 65/30* | (2006.01) |
| *B65G 67/04* | (2006.01) |
| *B60P 1/38* | (2006.01) |
| *A01C 7/00* | (2006.01) |
| *A01C 7/20* | (2006.01) |
| *A01C 15/00* | (2006.01) |

(52) U.S. Cl.
CPC ............... *A01C 7/208* (2013.01); *A01C 15/003* (2013.01)
USPC .............. 414/21; 414/325; 414/522; 177/136

(58) Field of Classification Search
USPC ........ 137/615; 177/103, 136, 139; 222/185.1; 280/417.1, 491.5; 414/21, 323, 326, 414/504, 523, 526, 332; 198/317–318
See application file for complete search history.

(56) References Cited

U.S. PATENT DOCUMENTS

| | | | | | |
|---|---|---|---|---|---|
| 2,678,738 | A | * | 5/1954 | Mangrum | 414/332 |
| 2,800,312 | A | * | 7/1957 | Ruby | 366/18 |
| 3,104,035 | A | * | 9/1963 | McKinney | 222/185.1 |
| 4,071,226 | A | * | 1/1978 | Miller | 366/64 |
| 4,483,404 | A | * | 11/1984 | Weihs | 177/255 |
| 4,571,143 | A | * | 2/1986 | Hellerich | 414/523 |
| 4,917,560 | A | * | 4/1990 | Murray et al. | 414/332 |
| 5,465,829 | A | * | 11/1995 | Kruse | 198/538 |
| 5,718,556 | A | * | 2/1998 | Forsyth | 414/503 |
| 5,797,614 | A | * | 8/1998 | Hord et al. | 280/417.1 |
| 5,888,044 | A | | 3/1999 | Baskerville | |
| 6,092,974 | A | * | 7/2000 | Roth | 414/526 |
| 6,120,233 | A | * | 9/2000 | Adam | 414/502 |
| 6,396,003 | B1 | * | 5/2002 | Friesen | 177/136 |
| 6,488,114 | B1 | * | 12/2002 | McMahon et al. | 180/414 |
| 6,675,958 | B2 | | 1/2004 | Kaeb et al. | |

(Continued)

*Primary Examiner* — Gregory Adams
(74) *Attorney, Agent, or Firm* — McKee, Voorhees & Sease

(57) ABSTRACT

A seed cart includes first and second mating frames. The hopper is mounted on the first frame for holding seed and has an outlet to discharge the seed. A conveyor is mounted on the second frame for movement between seed loading and unloading positions. A plurality of cylinders with extendible and retractable arms control the desired position of the conveyor. A plurality of load cells are mounted on the second frame and support the first frame. The weigh scales weigh the first frame, the hopper, and the seed in the hopper, without weighing the conveyor. Therefore, an accurate amount of seed can be dispensed from the hopper via the conveyor. Wheels and a hitch tongue can be detachably mounted on the second frame to convert the cart from a stationary unit to a mobile unit.

14 Claims, 9 Drawing Sheets

(56) References Cited

U.S. PATENT DOCUMENTS

| | | | |
|---|---|---|---|
| 6,893,202 B2* | 5/2005 | Hunt | 414/519 |
| 7,118,268 B2* | 10/2006 | Van Der Plas | 366/314 |
| 7,500,817 B2* | 3/2009 | Furrer et al. | 414/522 |
| 7,540,700 B2* | 6/2009 | Hook | 414/505 |
| 7,690,499 B2 | 4/2010 | Smith et al. | |
| 8,286,983 B2* | 10/2012 | Hellbusch | 280/417.1 |
| 2006/0180062 A1* | 8/2006 | Furrer et al. | 111/171 |
| 2008/0210145 A1 | 9/2008 | Petersen et al. | |
| 2009/0218147 A1* | 9/2009 | Wilson | 177/139 |
| 2010/0040446 A1* | 2/2010 | Renyer | 414/523 |
| 2010/0068021 A1 | 3/2010 | Petersen et al. | |
| 2010/0278621 A1* | 11/2010 | Redekop | 414/523 |

\* cited by examiner

SEED CART

CROSS-REFERENCE TO RELATED APPLICATIONS

This application claims priority under 35 U.S.C. §119 to provisional application Ser. No. 61/439,960 filed Feb. 7, 2011, herein incorporated by reference in its entirety.

BACKGROUND OF THE INVENTION

Seed carts have been used for many years for transporting bulk seed to the field. The prior art carts come in many sizes and shapes, and typically require a dedicated trailer for transportation to the field. Alternatively, some seed carts fit in the bed of a pickup truck. These transportation options limit the versatility of the cart.

The conventional seed cart includes an enlarged hopper with a lower discharge outlet or opening controlled by a moveable gate. A conveyor on the cart receives seed from the hopper outlet. The conveyor is normally mounted to or extended through the hopper. The conveyor may be pivotally mounted to the cart so that the conveyor outlet can be swung to a desired position for discharge of seed. The cart also may include weigh scales to weigh the amount of seed being discharged from the cart. Since the hopper and conveyor are interconnected, the scale weighs the hopper, the conveyor, and the seed. When a farmer is ready to dispense seed from the seed cart, the scale measures initial weight of the hopper, conveyor and seed. Initially, the seed is only in the hopper, and the conveyor is empty. The farmer can then select the quantity of seed to be dispensed, for example 100 lbs. When the scale senses that 100 lbs. of seed have been discharged from the conveyor, the gate on the hopper discharge automatically closes to shut off the flow of seed from the hopper to the conveyor inlet. However, the conveyor still has seed in the conveyor housing which continues to discharge as the conveyor runs after the gate is closed, thus discharging an excess of seed beyond the weight selected by the operator. Alternatively, the conveyor is shut off when the pre-selected amount of seed has been discharged, then the conveyor is re-positioned to empty the remaining seed back into the hopper. Thus, the prior art scale measures the weight of grain discharged from the conveyor, which leaves extra or residual grain in the conveyor after the selected weight of seed exits the conveyor.

Therefore, a primary objective of the present invention is the provision of an improved seed cart for transporting and discharging bulk seed.

Another objective of the present invention is the provision of a seed cart having first and second frames for the hopper and conveyor, respectively.

Another objective of the present invention is the provision of a seed cart having wheeled axles and hitch tongue which can be selectively attached or detached from the cart so that the cart is either stationary or mobile, as desired by the operator.

Still another objective of the present invention is the provision of a seed cart having a center of gravity considerably lower than conventional seed carts.

A further objective of the present invention is the provision of an improved seed cart having a telescoping conveyor swing arm so that the conveyor can be rotated for use in filling the cart.

Yet another objective of the present invention is the provision of an improved seed cart with scales which weigh only the hopper and hopper contents, without weighing the conveyor and conveyor contents.

Still another objective of the present invention is the provision of an improved seed cart wherein the hopper is mounted on a first frame, which in turn is supported on a second frame, with a plurality of load bars or cells disposed between the first and second frames so as to only weigh the first frame, the hopper, and the seed in the hopper.

A further objective of the present invention is the provision of an improved seed cart having a weigh scale which is accurate for dispensing a desired amount of seed from the cart.

Another objective of the present invention is the provision of an improved seed cart which is economical to manufacture, and durable and reliable in use.

These and other objectives become apparent from the following description of the invention.

SUMMARY OF THE INVENTION

The seed cart of the present invention includes first and second frames which are nested adjacent one another. The seed hopper is mounted on the first frame and the seed conveyor is mounted on the second frame. Scales, such as load cells, are mounted on the second frame and support the first frame so as to weigh the first frame, the hopper, and the seed in the hopper, without weighing the conveyor. The frames can be assembled so that the cart can be used in a stationary position. Alternatively, one or more axles with opposite wheels are detachably mounted to the second frame, along with a detachable tongue hitch so that the assembled cart can be towed for transport and use, without the need for a separate trailer for hauling the cart. The conveyor is attached to an extendible arm which allows the conveyor to be moved between an unloading position to convey seed from the cart and a fill position to convey seed into the cart.

DETAILED DESCRIPTION OF THE INVENTION

Figure 1:
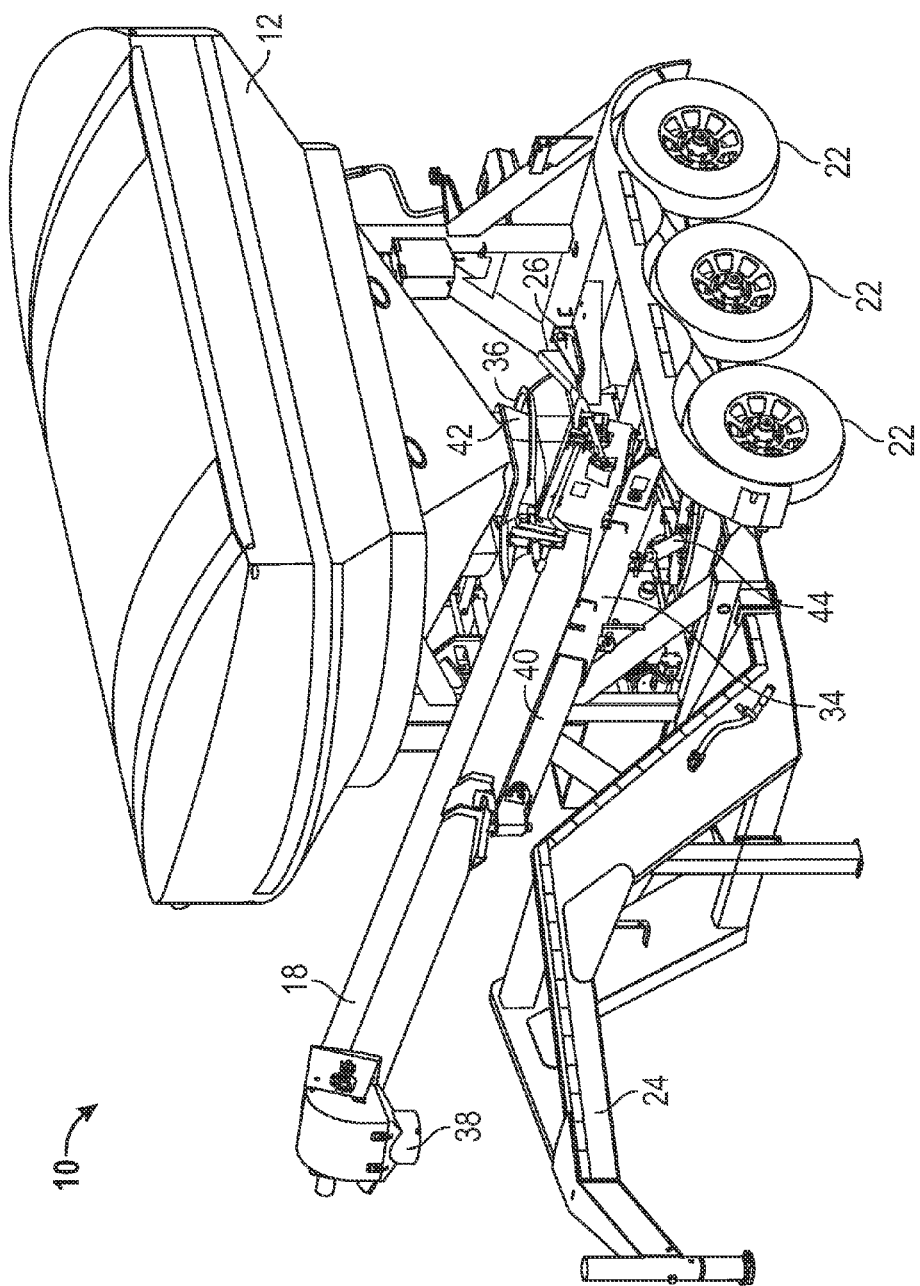
FIG. 1 is a perspective view of an improved seed cart according to the present invention in one embodiment with wheels and a tongue hitch provided for mobile use and transport of the cart.

The improved seed cart of the present invention is generally designated in the drawings by the reference numeral 10.

The major components of the cart 10 include the hopper 12, a first frame 14, a second frame 16, and a conveyor 18. The hopper 12 is mounted on the first frame 14, which in turn is seated around the second frame 16 so that the frames 14, 16 are nested adjacent one another. The conveyor 18 is pivotally mounted on the second frame 16. Preferably, the conveyor 18 includes a cleated belt. Alternatively, the conveyor 18 may include an auger.

One or more axles 20 with wheels 22 can be selectively attached or detached to the second frame 16, such that the cart 10 can be converted between a stationary unit and a mobile unit. A hitch tongue 24 can also be selectively bolted to the second frame 16 at either end of the cart 10 for hitching the cart to a tow vehicle, such as a truck or tractor.

Figure 3:
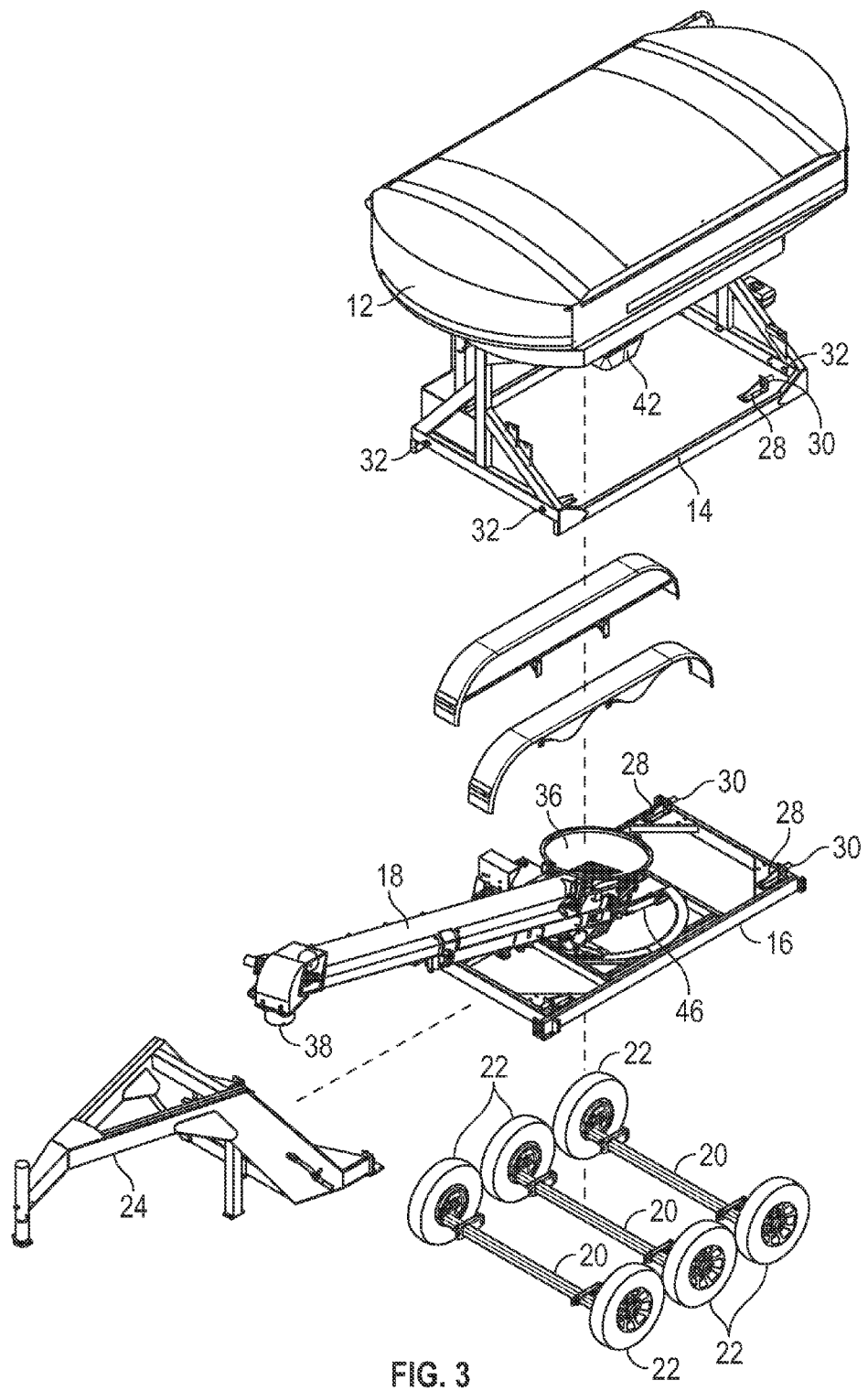
FIG. 3 is an exploded perspective view of the cart components.

The cart 10 includes a weigh scale, which preferably comprises a plurality of load cells 26 positioned at the four corners of the cart 10 on the second frame 16 so as to support the first frame 14, such that the weight of seed discharged from the hopper can be accurately measured. As seen in FIG. 3, each scale 26 has a body 28 mounted on the second frame 16 and a load bar 30 extending into a receiving tube 32 on the first frame 14. Thus, the first frame is supported on the load bars 30. Since the scales 26 only weigh the first frame, the hopper, and the seed content in the hopper, and do not weigh the second frame or the conveyor, the scales effectively weigh the seed being discharged from the hopper, rather than the seed being discharged from the conveyor, as in the prior art. Thus, the hopper gate will automatically close when the scales 26 sense the preselected weight of seed has been discharged from the hopper 12. Then, the conveyor can be completely emptied and all of the seed discharged from the conveyor 18 equals the preselected weight. The first and second frame assembly effectively isolates the load of the hopper 12 and its contents from the conveyer 18 for improved dispensement of seed from the hopper.

Figure 2:
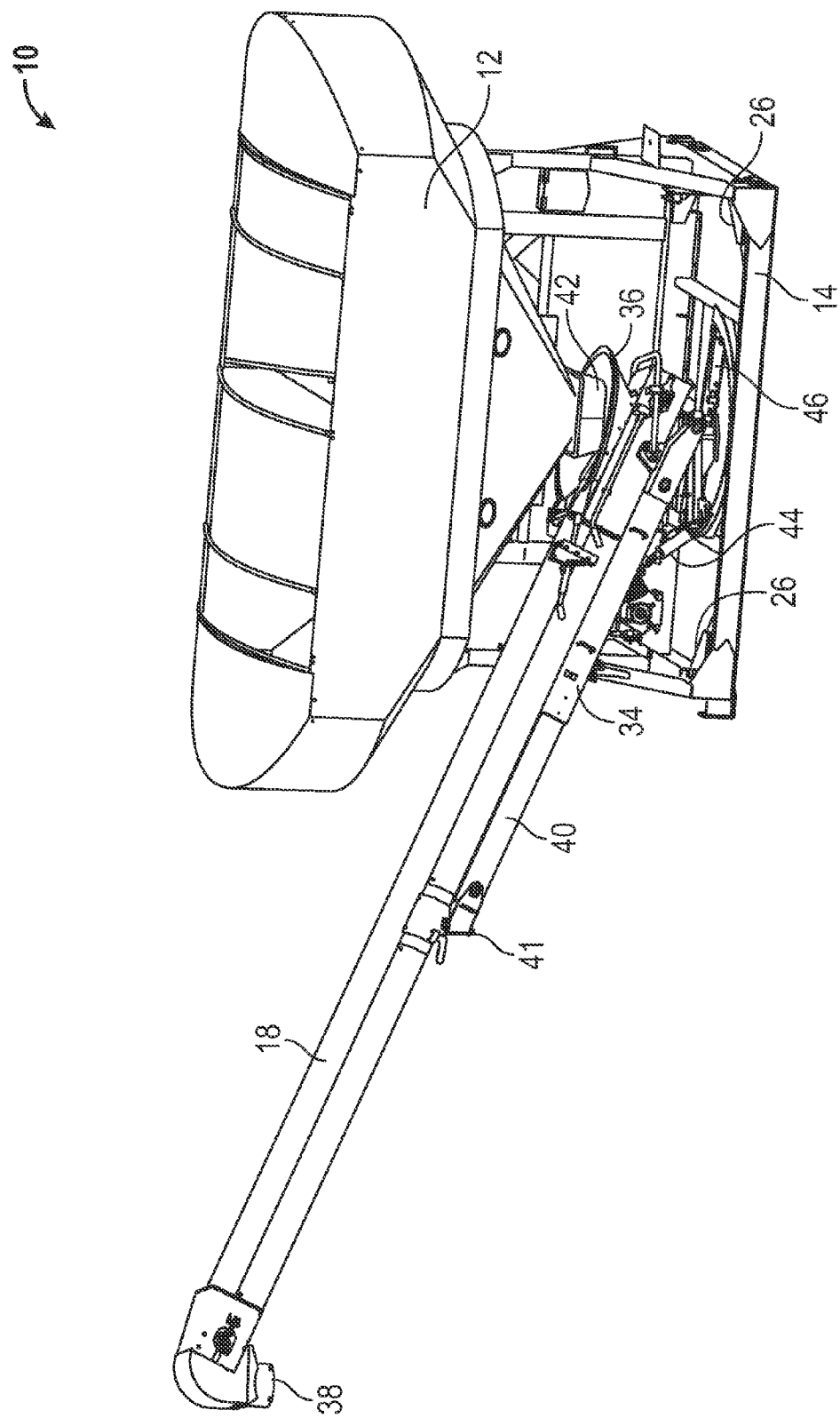
FIG. 2 is another perspective view of the improved seed cart according to the present invention in a second embodiment wherein the wheels and tongue hitch are removed for stationary use of the cart.
Figure 5:
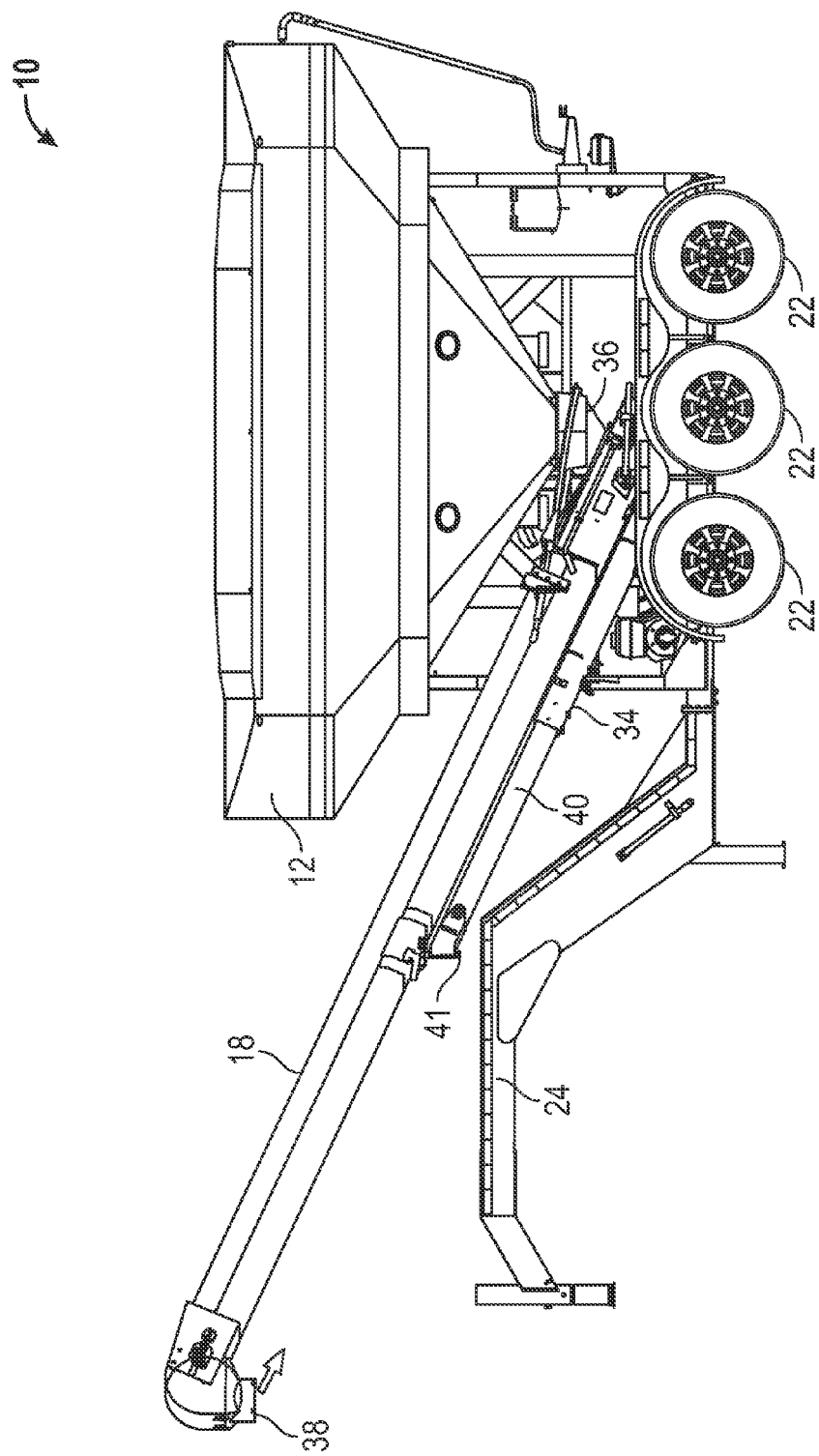
FIG. 5 is a view similar to FIG. 4 with the conveyor support arm in a fully extended position.
Figure 6:
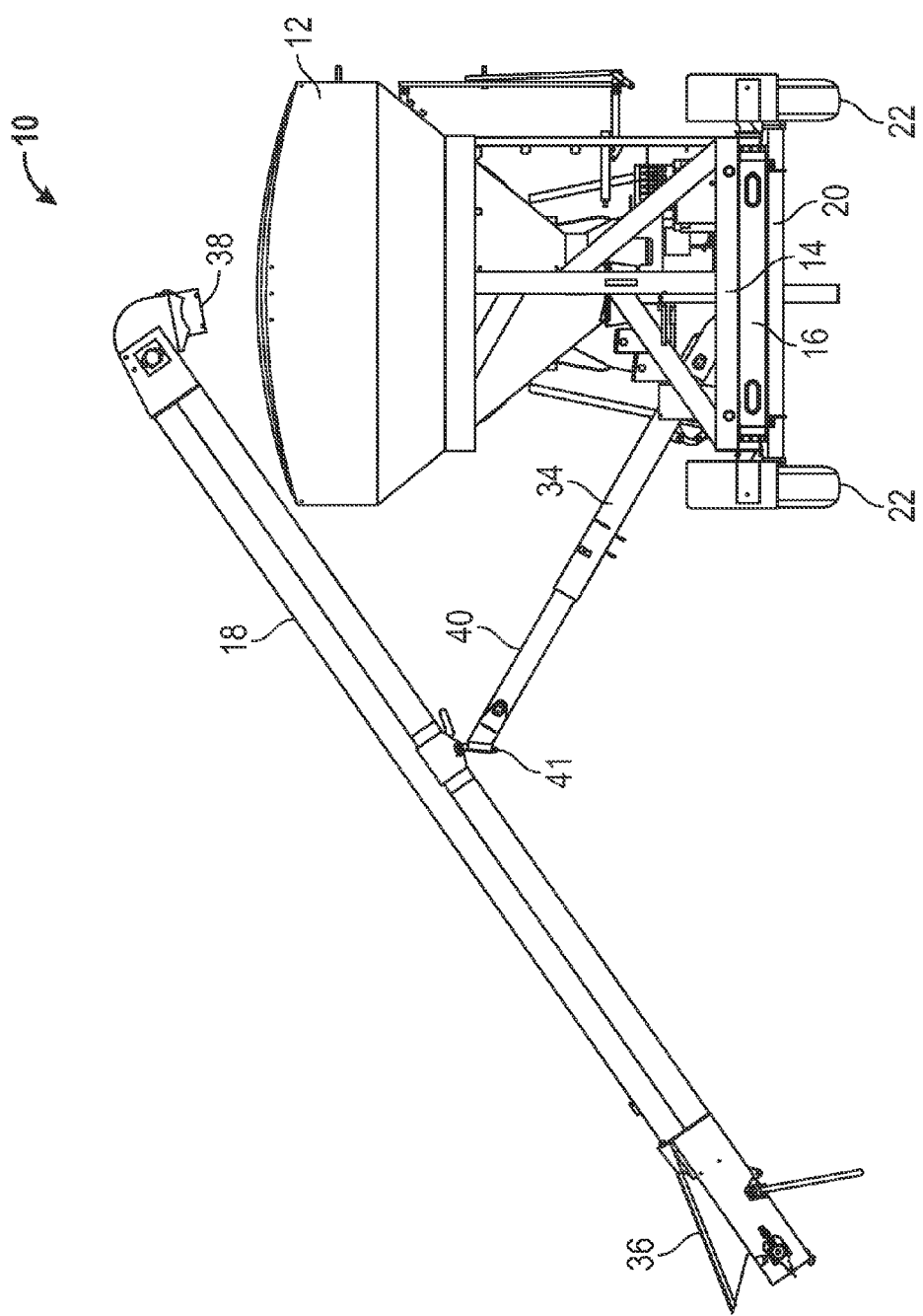
FIG. 6 is an end elevation view of the seed cart of the present invention with the conveyor moved to a cart filling position with the support arm extended.
Figure 7:
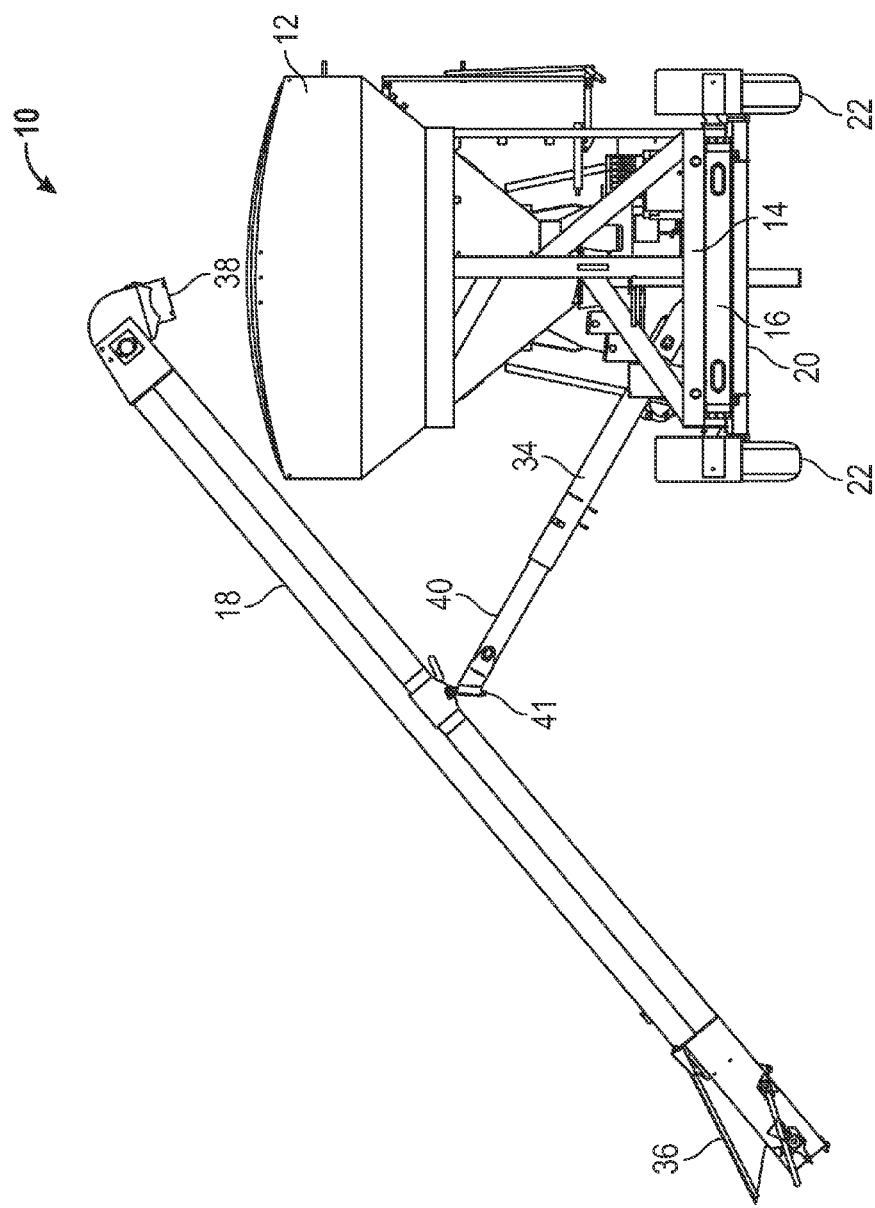
FIG. 7 is a view similar to FIG. 6 with the support arm retracted.

The conveyor 18 is moved between various positions with a plurality of hydraulic or pneumatic cylinders having extendible and retractable arms. A first cylinder 34 has a lower end pivotally connected to the second frame 16 and a retractable and extendible arm 40 with an upper end pivotally connected to the conveyor 18 at connection point 41. The cylinder 34 allows the conveyor 18 to be manually moved between loading positions shown in FIGS. 6, 7 and 9 and unloading positions shown in FIGS. 2, 5 and 8.

Figure 4:
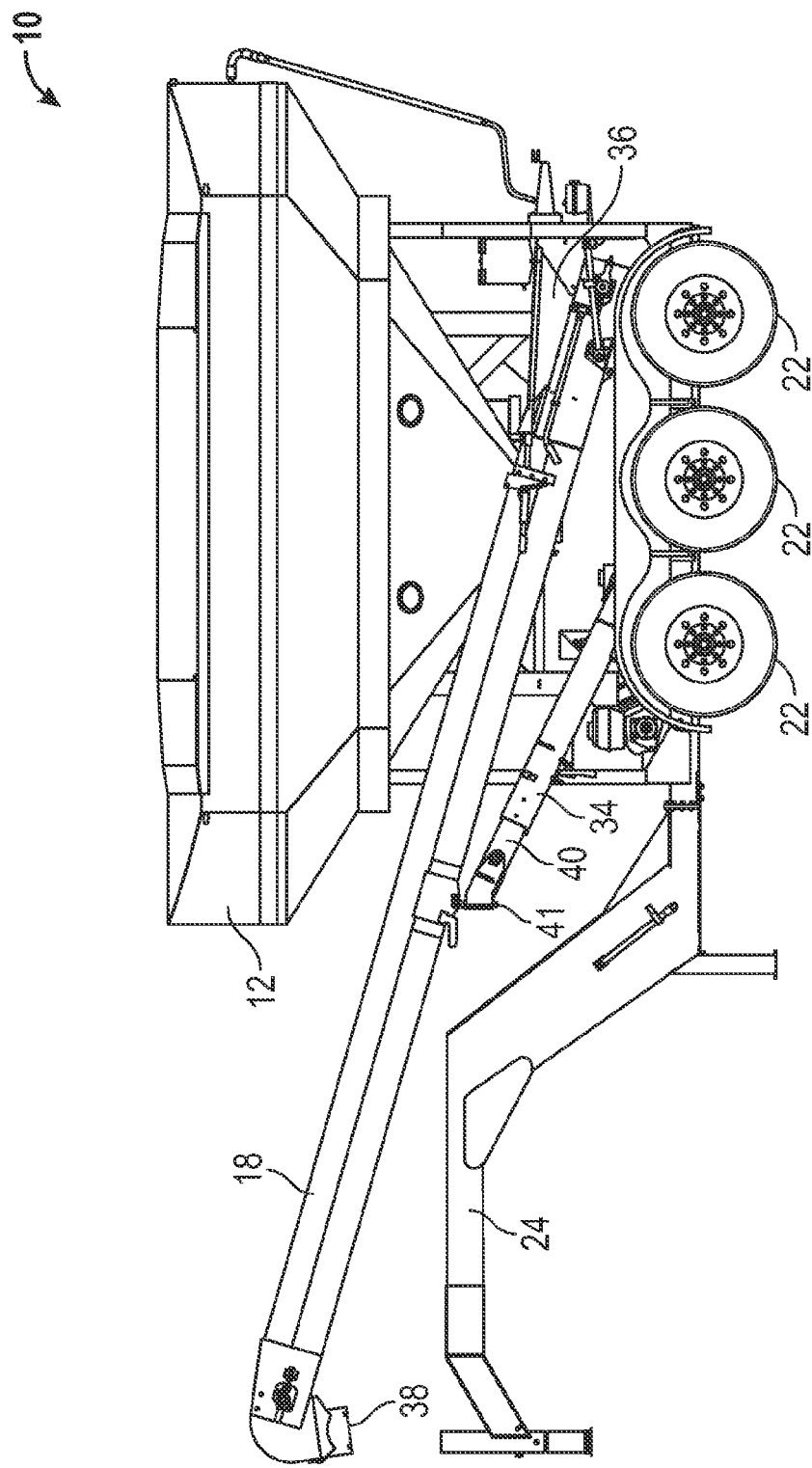
FIG. 4 is a side elevation view of the cart shown in FIG. 1 with the conveyor support arm in a retracted position for storage or transport.

More particularly, when the conveyor 18 is in the unloading position, shown in FIGS. 2, 4, 5 and 8, the inlet end 36 is beneath the seed outlet 42 of the hopper 12. When the conveyor 18 is in the cart loading or filling position, shown in FIGS. 6 and 7, the inlet end 36 of the conveyor 18 is spaced apart from the second frame 16 and the outlet end 38 of the conveyor 18 is positioned above the hopper 12 so that seed can be loaded into the conveyor inlet 36 and discharged from the conveyor outlet 38 into the hopper 12. The angle of the conveyor 18 and the location of the outlet 38 relative to the hopper 12 can be adjusted by extending and retracting the arm 40 of the cylinder 34. The pivot connection 41 allows the conveyor 18 to be pivoted relative to the cylinder 34, which pivots about its lower end relative to the frame 16. The cylinder 34 also slides the conveyor 18 rearwardly on the frame 16 when the arm 40 is retracted to a transport position, as seen in FIG. 4.

The height of the conveyor outlet 38 is adjusted by a second cylinder 44. The second cylinder 44 has a lower end connected to the second frame 16 and an upper end connected to the first cylinder 34 so as to adjust the angle of the conveyor 18 through a vertical plane, and thereby selectively position the outlet 38 of the conveyor 18 at a desired height in both the filing and unloading positions.

Figure 8:
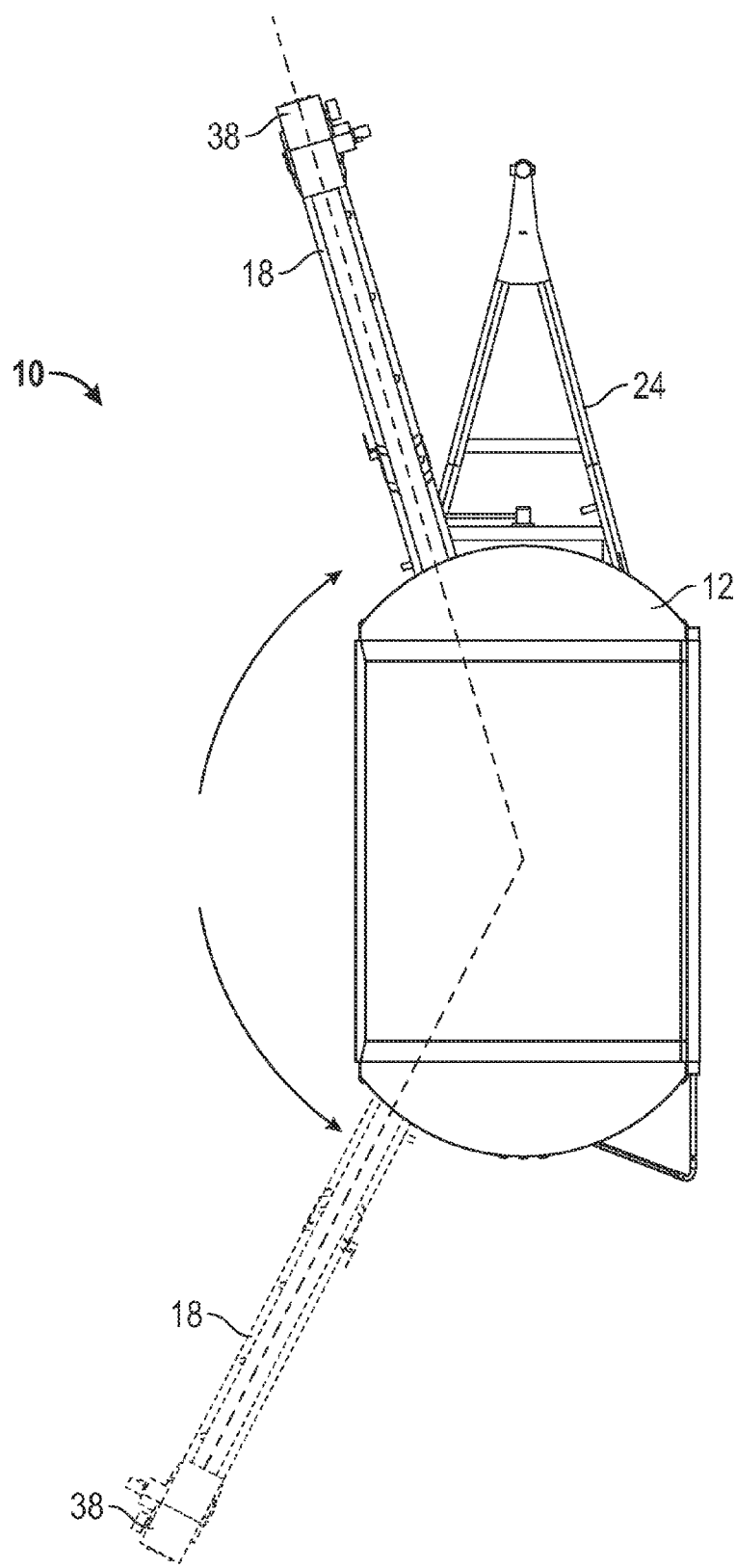
FIG. 8 is a top plan view of the cart showing the range of motion of the conveyor in its cart-unloading position.
Figure 9:
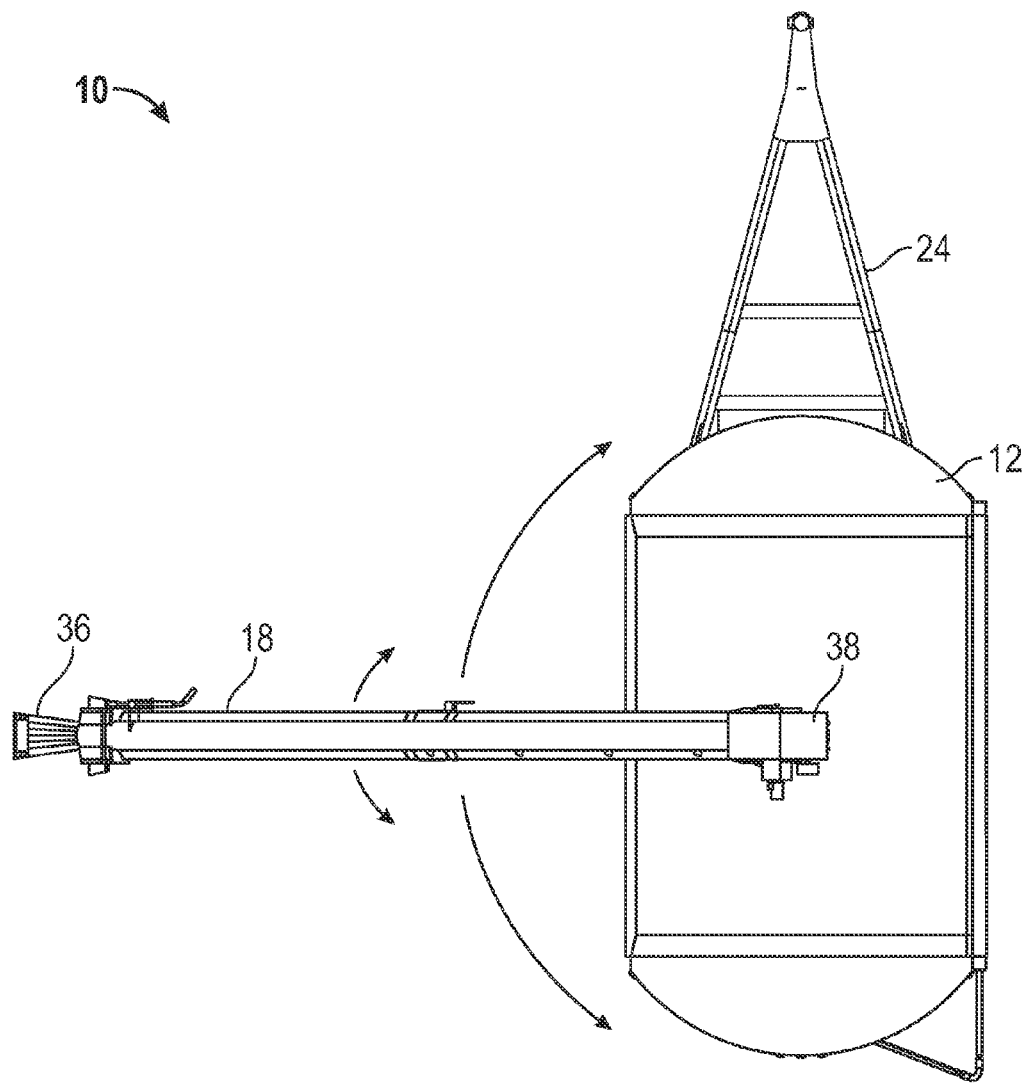
FIG. 9 is a top plan view of the cart showing the conveyor in its cart-filling position.

A third pair of cylinders 46 on opposite sides of the hopper outlet 42 extend between the second frame 16 and the first cylinder 34, and control the angular rotation of the conveyor 18 through a horizontal plane. The cylinders 46 push and pull the conveyor 18 about a vertical pivot axis to move the conveyor outlet 38 forwardly and rearwardly through an angular range as depicted in FIG. 8.

The cart 10 has a unibody design, with the control systems and conveyor integrated into the undercarriage of the cart 10. This unibody arrangement reduces the structure needed for the cart 10 and allows the cart 10 to quickly and easily be converted from a stationary unit to a mobile unit by adding the wheeled axles 20 and tongue 24. This unibody carriage eliminates the need for a separate trailer to haul or move the cart 10. Rather, the dual frame assembly allows the second frame to accommodate various first frames and hoppers. Thus, the first and second frames provide a modular assembly, which can be interchanged with other assemblies having different sizes or shapes. This eliminates the need for a specific trailer assigned for a specific cart, as in the prior art.

The construction of the cart 10, including the first frame 14 and second frame 16, provide a low center of gravity, which is considerably lower than that of conventional seed cart 10. This improved center of gravity enhances handling and safety for the cart 10 and its operator.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A seed cart, comprising:
a first frame;
a second frame adjacent the first frame;
a hopper on the first frame for holding seed;
a conveyor pivotably mounted on the second frame for movement between a loading position to transport seed into the hopper and an unloading position to transport seed from the hopper; and
a cylinder having a lower end pivotally connected to the second frame and a telescoping arm pivotally connected to the conveyor to control movement of the conveyor between the loading and unloading positions relative to the hopper.

2. The seed cart of claim 1 further comprising
weigh scales between the first frame and the second frame and supporting the first frame so as to weigh the hopper without weighing the conveyor.

3. The seed cart of claim 2 further comprising at least one axle with wheels removably mounted to the second frame.

4. The seed cart of claim 3 further comprising a hitch tongue removably mounted to the second frame.

5. The seed cart of claim 1 wherein the hopper is free from internal seed mixing mechanisms.

6. The seed cart of claim 2 further comprising the weigh scale includes a load bar mounted at each corner of the second frame.

7. The seed cart of claim 1 further comprising
a wheeled axle selectively and detachably mounted to the first frame to allow the cart to be mobile when the axle is attached and stationary when the axle is detached;
a hitch tongue selectively and detachably mounted to the first frame for towing the cart when the tongue is attached;

the axle and the tongue being independently mounted to the first frame; and the first frame, the axle and the tongue creating a trailer when mounted together.

8. The seed cart of claim 7 wherein the hopper has an open interior chamber without mixing apparatus.

9. The seed cart of claim 1 further comprising scale between the frames to weigh only the first frame, the hopper and seed in the hopper.

10. The seed cart of claim 9 wherein the conveyor weight is isolated from the scale.

11. The seed cart of claim 9 further comprising at least one axle with a pair of wheels and a hitch tongue are removably mounted to the second frame so that the hopper is selectively stationary or mobile.

12. The seed cart of claim 9 wherein the first and second frames have complimentary perimeter shapes.

13. The seed cart of claim 9 wherein the scale includes a plurality of spaced apart load bars.

14. The seed cart of claim 9 wherein the seed in the hopper is not mechanically mixed.

\* \* \* \* \*